United States Patent
Sarmento et al.

(10) Patent No.: US 9,928,466 B1
(45) Date of Patent: Mar. 27, 2018

(54) APPROACHES FOR ANNOTATING PHRASES IN SEARCH QUERIES

(71) Applicant: A9.com, Inc., Palo Alto, CA (US)

(72) Inventors: Luis Antonio Diniz Fernandes de Morais Sarmento, Seattle, WA (US); Chandrasekhar Iyer, Pleasanton, CA (US); Tanvi Sudarshan Motwani, Mountain View, CA (US)

(73) Assignee: A9.COM, INC., Palo Alto, CA (US)

( * ) Notice: Subject to any disclaimer, the term of this patent is extended or adjusted under 35 U.S.C. 154(b) by 596 days.

(21) Appl. No.: 14/446,255

(22) Filed: Jul. 29, 2014

(51) Int. Cl.
*G06F 15/18* (2006.01)
*G06N 99/00* (2010.01)
*G06F 17/30* (2006.01)

(52) U.S. Cl.
CPC ..... *G06N 99/005* (2013.01); *G06F 17/30483* (2013.01); *G06F 17/30684* (2013.01); *G06F 17/30687* (2013.01); *G06F 17/30864* (2013.01)

(58) Field of Classification Search
CPC .................................................. G06N 99/005
USPC .......................................................... 706/12
See application file for complete search history.

(56) References Cited

U.S. PATENT DOCUMENTS

| | | | |
|---|---|---|---|
| 9,104,750 B1* | 8/2015 | Dhamdhere | G06F 17/3064 |
| 9,607,100 B1* | 3/2017 | Ware | G06F 17/3097 |
| 9,720,974 B1* | 8/2017 | Sarmento | G06F 17/30525 |
| 9,727,614 B1* | 8/2017 | Sarmento | G06F 17/30522 |
| 9,727,906 B1* | 8/2017 | Sarmento | G06Q 30/0631 |
| 9,747,628 B1* | 8/2017 | Sarmento | G06Q 30/0625 |
| 9,760,930 B1* | 9/2017 | Sarmento | G06Q 30/0625 |
| 2011/0314011 A1* | 12/2011 | Buehrer | G06F 17/30864 707/728 |
| 2017/0242886 A1* | 8/2017 | Jolley | G06F 17/30401 |
| 2017/0242899 A1* | 8/2017 | Jolley | G06F 17/30554 |
| 2017/0243107 A1* | 8/2017 | Jolley | G06F 17/30864 |

OTHER PUBLICATIONS

Query Splitting for Context-Driven Federated Recommendations Hermann Ziak; Roman Kern 2016 27th International Workshop on Database and Expert Systems Applications (DEXA) Year: 2016 pp. 193-197 IEEE Conference Publications.*

(Continued)

*Primary Examiner* — Michael B Holmes
(74) *Attorney, Agent, or Firm* — Hogan Lovells US LLP

(57) ABSTRACT

A computing device can generate a collection of phrases using both authoritative data and behavioral data, for example, using previously submitted search queries. The collection of phrases can be used, in part, to determine the best segmentation of search queries. Each segmentation of a search query splits the terms in search query using different permutations or n-grams to identify one or more phrases. Each segmentation is scored based on various criteria. The segmentation having the highest score is included in training data for training a predictive model that predicts segmentations for new search queries. The predicted segmentation can be used to annotate that query to identify the one or more phrases that were created by the segmentation of the query. The annotated query can be processed, for example, by a search engine, to obtain resources that are responsive to the one or more phrases that were identified by the segmentation.

20 Claims, 6 Drawing Sheets

(56) References Cited

OTHER PUBLICATIONS

Understanding Short Texts through Semantic Enrichment and Hashing Zheng Yu; Haixun Wang; Xuemin Lin; Min Wang IEEE Transactions on Knowledge and Data Engineering Year: 2016, vol. 28, Issue: 2 pp. 566-579 IEEE Journals & Magazines.*

Learning a dual-language vector space for domain-specific cross-lingual question retrieval Guibin Chen; Chunyang Chen; Zhenchang Xing; Bowen Xu 2016 31st IEEE/ACM International Conference on Automated Software Engineering (ASE) Year: 2016 pp. 744-755 IEEE Conference Publications.*

Learning query expansion from association rules between terms Ahem Bouziri; Chiraz Latiri; Eric Gaussier; Yassin Belhareth 2015 7th International Joint Conference on Knowledge Discovery, Knowledge Engineering and Knowledge Management (IC3K) Year: 2015, vol. 01 pp. 525-530 IEEE Conference Publications.*

* cited by examiner

APPROACHES FOR ANNOTATING PHRASES IN SEARCH QUERIES

BACKGROUND

Users are increasingly using electronic devices to obtain various types of information. For example, a user wanting to purchase a pair of shoes can interact with their electronic device to browse an electronic catalogue, and to search for different types of shoes that are being offered in the electronic catalogue.

Users can often submit search queries to a search engine to facilitate the retrieval of such information. Search engines typically identify and return a set of search results. Each search result generally references a resource that was identified as being responsive to the search query submitted by a user. Such resources can include, for example, web pages, images, documents, and multimedia content.

Since each search query generally comprises of just a set of terms, it may be difficult for search engines to determine any relationships between the terms in the set of terms. Since knowledge of any relationships between the set of terms can be useful in identifying more relevant resources, such difficulty can ultimately affect the quality of the search results that are presented to users.

BRIEF DESCRIPTION OF THE DRAWINGS

Various embodiments in accordance with the present disclosure will be described with reference to the drawings, in which.

DETAILED DESCRIPTION

Figure 1:
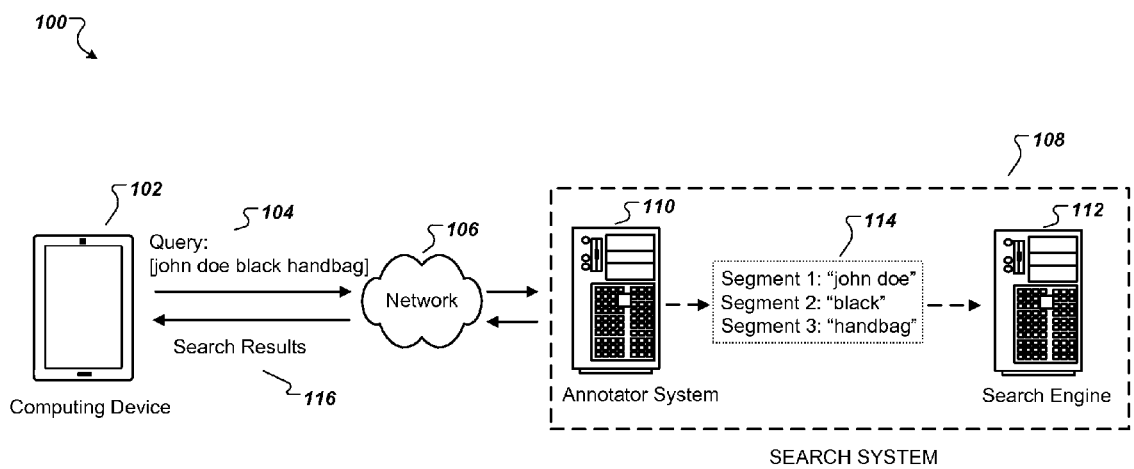
FIG. 1 illustrates an example diagram showing a computing device interacting with a search system in accordance with various embodiments.

Systems and methods in accordance with various embodiments of the present disclosure overcome one or more of the above-described deficiencies and other deficiencies in conventional approaches to processing search queries to obtain more responsive resources. In particular, various embodiments of the present disclosure can provide a method for splitting terms in a search query into one or more phrases and then annotating the search query to indicate the respective positions of these phrases in the search query. In some implementations, each part of the search query participates in one and only one phrase.

For example, a search query for "chocolate cupcakes bakery" can be segmented to indicate that "chocolate cupcakes" is one phrase and "bakery" is another phrase. This search query can be annotated to indicate the identified phrases. In contrast to simply searching for the terms "chocolate," "cupcakes," and "bakery," as distinct individual terms, the annotated search query can be processed by a search engine by interpreting the set of terms "chocolate cupcakes" as one phrase and the term "bakery" as a separate phrase to more accurately identify resources that are responsive to the search query.

Since the search query "chocolate cupcakes bakery" can be segmented in a number of ways. For example, a first segmentation is to treat "chocolate," "cupcakes," and "bakery" as individual phrases. A second segmentation is to treat the terms "chocolate cupcakes" as one phrase and the term "bakery" as a different phrase. A third segmentation is to treat the term "chocolate" as one phrase and the terms "cupcakes bakery" as another phrase. Finally, another segmentation is to treat the terms "chocolate cupcakes bakery" as one single phrase.

In various embodiments, approaches described herein are directed to automatically determining the best segmentation for any given search query and annotating the search query to describe that best possible segmentation. The approaches described involve training a predictive model to automatically determine the best segmentation of a search query. Each segmentation of the search query can be a sequence of phrases in the search query.

A phrase can refer to a non-overlapping sequence of tokens in the entire search query that would lose their meaning if broken into separate tokens. In some implementations, each token or sequence of tokens in the search query is part of at least one phrase. Phrases can be biased toward identifying products, product features and attributes, and search restrictions or preferences. For example, when identifying products, the product can be a specific product (e.g., "model Z500 air conditioner) or a generic product (e.g., "vitamin d"). Product features or attributes can include product brand names, titles, attributes (e.g., "zebra pattern"). Search restrictions can be based on price (e.g., "under $25") and preferences can be any selectable preference (e.g., "free shipping").

In some embodiments, training the predictive model can involve a phrase collection phase, followed by generating training data describing the best segmentations for a collection of search queries, and finally using the generated training data to train the predictive model.

The phrase collection phase involves generating a resource of known phrases that can be used to determine whether or not a search query contains a potential phrase. This resource of known phrases can be assembled using both authoritative data and behavioral data.

Authoritative data can include, for example, terms that appear in dictionaries, topics from encyclopedias, and product or service brand names, to name a few examples. For example, the respective title of some or all articles in an online dictionary or encyclopedia can be extracted and stored in the resource of known phrases.

Behavioral data can include, for example, sets of terms that frequently appear adjacent to one another in search queries (e.g., "funfetti cupcakes"). In other words, the behavior data can include collocations which is a sequence of words or terms that co-occur more often than would be expected by chance.

Once the resource of known phrases has been created, various approaches can be applied to search queries, for example, obtained from query logs, to determine the best way to segment those search queries. To determine the best segmentation for a search query, in various embodiments, each possible segmentation of that search query is individually evaluated and scored. The segmentation having the best score is selected to be included in the training data that will be used to train the predictive model. A best segmentation is determined for a variety of search queries, for example, as obtained from query logs and these respective best segmentations can be included in the training data that will be used to train the predictive model.

This predictive model can be trained to accept as input an unannotated search query and, by applying various statistical predictive techniques, the predictive model can automatically output a predicted segmentation for the search query. The search query can then be annotated based on the predicted segmentation. These annotations signify terms or sets of terms that appear in the search query, each of which constitute a phrase. These annotations can then be used, for example, to optimize a search engine to treat the annotated terms or sets of terms as phrases which can facilitate the retrieval of resources that are more responsive to search queries submitted by users.

By utilizing a predictive model, new search queries can be segmented both quickly and automatically as the model can be easily implemented to run in real-time, for example, in a search engine. The predictive model can also determine and generalize various patterns in the training data and later apply these generalized patterns to new search queries that the predictive model has not seen before.

Other advantages, variations, and functions are described and suggested below as may be provided in accordance with the various embodiments.

FIG. 1 illustrates an example diagram 100 showing a computing device 102 in communication with a search system 108. The computing device 102 will generally include memory for storing instructions and data, and a processor for executing the stored instructions.

In FIG. 1, a user is interacting with the computing device 102, for example, through a software application executing on the computing device 102, to submit a search query 104 "john doe black handbag" to the search system 108. The computing device 102 can transmit the search query 104 to the search system 108 over a network 106, for example, a local area network (LAN) or wide area network (WAN), e.g., the Internet.

The search system 108 can include a search engine 112 that performs a search to identify resources that are responsive to the search query 104 and an annotator system 110. Both the search engine 112 and the annotator system 110 will generally include respective memory for storing instructions and data, and at least one processor for executing the stored instructions.

When the computing device 102 transmits the search query 104 to the search system 108, the search engine 112 can identify resources that match the search query 104, for example, from an index database that includes collections of data describing various resources. The search engine 112 can generate search results 116 that are transmitted back to the computing device 102 over the network 106, for example, for presentation on a display screen of the computing device 102 as a search results web page.

In various embodiments, the search system 108 also includes an annotator system 110 that is configured to segment and annotate search queries to identify phrases that appear in the search query. In the example of FIG. 1, the search query 104 being submitted is a set of terms "john doe black handbag." When the search query 104 is received by the search system 108, the annotator system 110 can evaluate the search query 104 using a predictive model to predict the best way to segment the search query 104 and to annotate the search query 104 based on the predicted segmentation.

The search query 104 can be annotated, for example, using JavaScript Object Notation (JSON). The predictive model can be trained using training data that comprises a collection of search queries and their corresponding desired segmentations. The predictive model can utilize generally known machine learning techniques for making the predictions. For example, the predictive model can be a sequence labeling model that utilizes generally known sequence labeling techniques. Sequence labeling is a type of pattern recognition task that involves the algorithmic assignment of a categorical label to each member of a sequence of observed values.

In some embodiments, the predictive model utilizes a conditional random field, which is a modeling technique for sequence labeling. The conditional random field can utilize certain features including, for example, trigram word features, bigram word features, bigram output label features, context window of +/−4, or if the word is an alphanumeric word, to name a few examples. For example, applying trigram word features, for a query "john doe black leather handbag," the features evaluated, for example, for evaluating the word "black," include "john doe black" and "black leather handbag." Similarly when applying bigram word feature for evaluating the word "black", features evaluated include "john doe", "doe black" and "black leather". A context window of +/−4 specifies that, for any n-gram features, only the four words preceding a word and the four words subsequent to the word are evaluated. Considering whether a word is an alphanumeric word as a feature helps segmenting search queries that include model numbers. Using the output label feature means that as a word in a query is evaluated, a label for a previous set of terms (may be mentioned too many times previously) can be used to label the evaluated word.

In the example of FIG. 1, the annotator system 110 has annotated the search query 114 to indicate that the terms "john doe" correspond to a first phrase, that the term "black" corresponds to a second phrase, and the term "handbag" corresponds to a third phrase. In this example, the terms "john doe" together refer to a product brand and therefore carry more weight than identifying the terms "john" and "doe" as independent phrases.

Thus, for example, indicating to the search engine 112 that the terms "john" and "doe" should be treated as a single phrase can be used to optimize the retrieval of responsive resources that include the terms "john doe" together as opposed to identifying resources that include the terms "john" and "doe" separately.

In some implementations, the annotations for a search query can describe respective types or categories for certain terms or sets of terms. For example, the segmented search query 104 can be annotated to indicate that the term "black" corresponds to a color and that the term "handbag" corresponds to a women's accessory. These annotations indicating that a term or set of terms corresponds to a type or category can also be used by the search engine 112 to optimize the retrieval of resources that are responsive to the search query 104.

Figure 2:
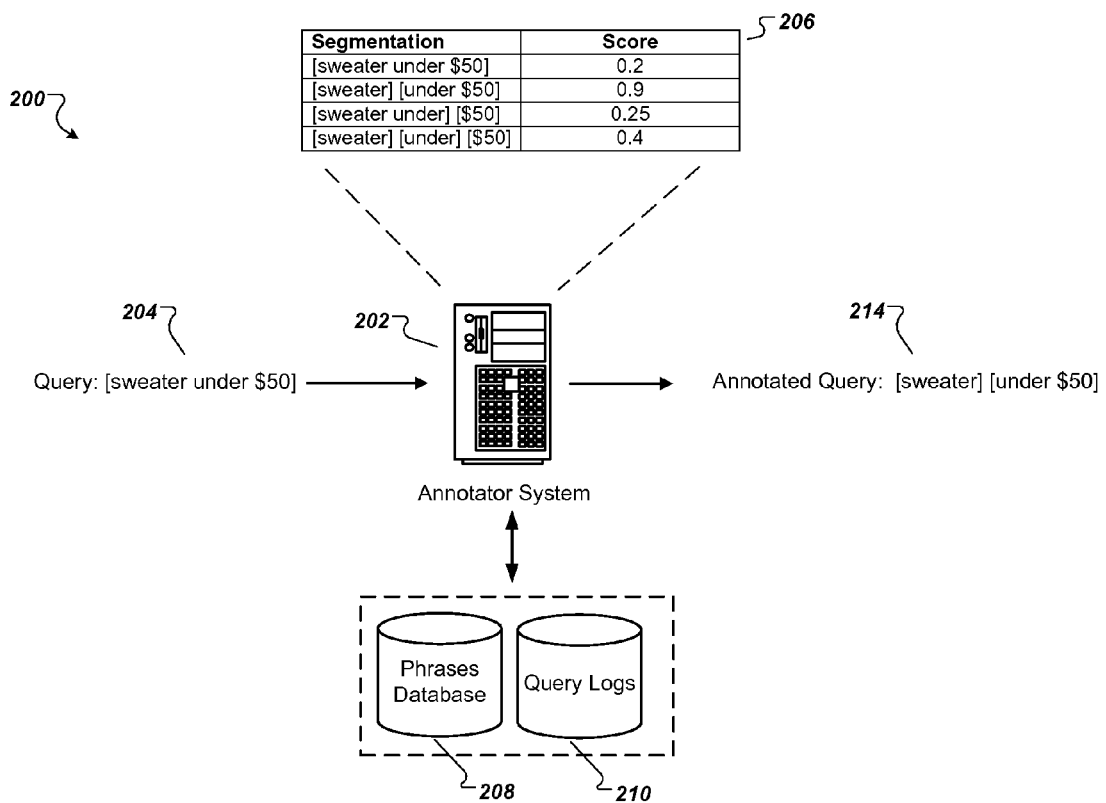
FIG. 2 illustrates an example diagram showing an annotator system generating training data for training a predictive model in accordance with various embodiments.

FIG. 2 illustrates an example diagram 200 showing an annotator system 202 generating training data for training a predictive model in accordance with various embodiments.

The annotator system 202 will generally include memory for storing instructions and data as well as a processor for executing the stored instructions. In FIG. 2, the annotator system 202 is in communication with various resources (e.g., storage mediums or databases) including a phrases database 208 that includes data describing a collection of known phrases. The annotator system 202 is also able to access resources that contain query logs 210. The query logs 210 generally include a listing of search queries that have been submitted, for example, to the search system 108, by various users over a period of time. Further, the query logs 210 can be updated regularly to include data describing new search queries that have been submitted by users.

As mentioned, in some implementations, the generating of training data involves generating a resource (e.g., the phrases database 208) of known phrases that can be used to determine whether or not a search query contains a potential phrase. Ultimately, the phrases stored in the phrases database 208 will be used to determine the best segmentations for various search queries. These segmented search queries will be used as training data to train a predictive model (e.g., a trained statistical model) for automatically segmenting future search queries into one or more phrases.

The phrases database 208 can include both authoritative data and behavioral data.

Authoritative data can include, for example, data obtained from an encyclopedia (e.g., Wikipedia™). An encyclopedia will generally include a collection of articles (e.g., web pages) that are each directed to a specific topic. In this example, the annotator system 202 can be configured to extract the titles from articles (e.g., web pages) in the encyclopedia and store the extracted titles as phrases in the phrases database 208. Some resources may include articles in a variety of languages. In such instances, the annotator system 202 can be configured to collect phrases from articles written in any language.

In some implementations, when storing data in the phrases database 208, the annotator system 202 also stores information identifying the resources from which the data was extracted.

This information can be used to adjust the weighting of certain phrases that are in the phrases database 208. For example, a phrase "mocha latte" in the phrases database 208 can be given more weight in terms of scoring if this phrase was extracted from five different resources. In contrast, a phrase "lemon latte" in the phrases database 208 can be given less weight in terms of scoring if this phrase was extracted from only one resource.

Another example authoritative resource is a dictionary (e.g., Wiktionary™) which generally includes a collection of words in various languages. Similarly, the annotator system 202 can be configured to extract the words from entries in the dictionary and store the extracted words as phrases in the phrases database 208. For dictionaries that are available online, the annotator system 202 can extract titles from entries (e.g., web pages) in the dictionary and store the extracted titles as phrases in the phrases database 208.

In another example, the annotator system 202 can obtain data describing a listing of brand names for products or services written in a variety of languages. This listing of brand names can be stored in the phrases database 208 to be used for building the predictive model. The annotator system 202 can also store in the phrases database 208 data describing classifications or taxonomies of products or services. One example product classification may include a category "Home & Kitchen" which includes a sub-category "Kitchen & Dining," which includes a sub-category "Small Appliances," which includes a sub-category "Contact Grills." In this example, the title of the category and titles of sub-categories can be included in the phrases database 208.

The annotator system 202 can also be configured to obtain keywords (e.g., vendor keywords) that are associated with product or service identifiers and store these keywords and identifiers in the phrases database 208. For example, a keyword "acme griller model 50" may be associated with a numerical identifier "AG1522516" that identifies a product. In this example, the keyword "acme griller model 50," the numerical identifier, or both, can be stored in the phrases database 208.

As mentioned, the phrases database 208 can also include various behavioral data. Behavioral data can include collocations, for example, sets of terms that appear adjacent to one another in search queries (e.g., "chocolate cake") more often than would be expected by chance. The fact that certain terms co-occur together, in search queries or other text, very often is sufficient for including that set of terms in the resource of known phrases. For example, the terms "cat video" may not be found in dictionaries or encyclopedias, but if this set of terms occur together with a high probability, then the set of terms "cat video" can be included in the resource of known phrases.

The annotator system 202 can also evaluate search queries included in the query logs 210 to determine respective counts for the number of times a term or set of terms appears in the search queries included in the query logs 210. Thus, for example, the annotator system 202 is able to determine the number of times the set of terms "chocolate chip" appears, as well as the number of times the term "chocolate" appears in search queries and the number of times the term "chip" appears in search queries.

In some implementations, terms or sets of terms that appear together in search queries with high probability are included in the phrases database 208. Thus, for example, if the set of terms "funfetti cupcakes" appear together with high probability in the search queries included in the query logs 210, then this set of terms can be included in the phrases database 208.

The annotator system 202 can also determine the number of times a set of terms are substituted for different terms when users reformulate their search queries. For example, a user initially may submit a search query for "chocolate chip cupcakes" and then submits a reformulated search query for "red velvet cupcakes." In this example, the reformulation of "chocolate chip" with "red velvet" is a signal that "chocolate chip" is a phrase since it was substituted with another phrase "red velvet." The annotator system 202 can evaluate the search queries in the collection of search queries to determine the number of times certain terms (e.g., "chocolate chip") are substituted for other terms or phrases (e.g., "red velvet") as part of query reformulation.

In some implementations, terms or sets of terms that are substituted a threshold number of times are included in the phrases database 208. Thus, for example, if the set of terms "funfetti cupcakes" was reformulated in subsequent search queries as "vanilla cupcakes" a threshold number of times, then the term "funfetti" can be stored in the phrases database 208.

Once the resource of known phrases has been created, various approaches can be applied to generate training data for training the predictive model. In some embodiments, the training data is generated by evaluating search queries, for example, as obtained from query logs 210, to determine the best way to segment those search queries. These segmented search queries can then be used as training data for the predictive model.

In various embodiments, to determine the best segmentation for a search query, each possible segmentation of that search query is individually evaluated and scored. The segmentation having the best score is selected to be included in the training data.

In the example of FIG. 2, the annotator system 202 is evaluating a search query 204 "sweater under $50" to determine the best possible segmentation for the search query 204. To determine the best segmentation, the annotator system 202 determines a score for each possible segmentation of the search query 204.

The search query 204 "sweater under $50" will have four possible segmentations, as illustrated in table 206. As shown, the search query 204 has a first segmentation "sweater under $50" in which all three terms are collectively evaluated as a potential phrase. The search query 204 has a second segmentation "sweater" and "under $50," in which the term "sweater" is evaluated as one potential phrase and the set of terms "under $50" are evaluated as a separate potential phrase. The search query 204 has a third segmentation "sweater under" and "$50," in which the set of terms "sweater under" are evaluated as one potential phrase and the term "$50" is evaluated as a separate potential phrase. The search query 204 has a fourth segmentation "sweater," "under," and "$50," in which the term "sweater" is evaluated as a first potential phrase, the term "under" is evaluated as a second potential phrase, and the term "$50" is evaluated as a third potential phrase.

To determine the best segmentation for the search query 204, each potential segmentation is scored based in part on the potential phrases in that segmentation.

For example, when evaluating the segmentation "sweater" and "under $50," a first score is determined for the term "sweater" and a second score is determined for the term "under $50." The first and second scores are then combined to determine a total score for that segmentation.

When scoring the segmentation "sweater" and "under $50," the annotator system 202 can determine a score for the term "sweater" as a potential phase by determining whether the term "sweater" matches a phrase in the phrases database 208. Assuming that "sweater" matches a phrase in the phrases database 208, the annotator system 202 can assign a numerical score to this term. As mentioned, in some implementations, when storing phrases in the phrases database 208, the annotator system 202 also stores information identifying the resources from which the phrases were extracted. Thus, in some implementations, the annotator system 202 can adjust the score assigned to the term "sweater" based on the resource or resources in which that phrase was originally identified. For example, the term "sweater" can be assigned a higher score if the term was extracted from a dictionary as opposed to having been extracted from a product classification.

In some implementations, the annotator system 202 can further adjust the score assigned to the term "sweater" based on the number of resources from which this phrase was extracted. For example, if the term "sweater" was extracted from a product classification in addition to having been extracted from a dictionary, then the score assigned to the term can be increased. Similarly, if the term "sweater" was also extracted from an encyclopedia in addition to the product classification and the dictionary, then the assigned score can further be increased.

Next, the annotator system 202 determines the number of times the term "sweater" has appeared in search queries, for example, included in the query logs 210. The annotator system 202 can then adjust the score assigned to the term "sweater" based in part on the frequency with which this term appeared in the search queries included in the query logs 210.

Continuing with the example of scoring the potential segmentation "sweater" and "under $50," the annotator system 202 determines a second score for the set of terms "under $50," for example, by determining whether the set of terms "under $50" match a phrase in the phrases database 208. If the set of terms "under $50" matches a phrase in the phrases database 208, the annotator system 202 can assign a score to this set of terms, as described above. Additionally, the annotator system 202 can determine the number of times the set of terms "under $50" appeared in search queries, for example, included in the query logs 210. The annotator system 202 can then adjust the score assigned to the set of terms "under $50" based in part on the frequency with which this set of terms appeared in the collection of search queries.

In some embodiments, the annotator system 202 is configured to increase the score assigned to a set of terms based on the number of terms (e.g., length) in the set of terms. In other words, the amount of adjustment applied to the score of a set of terms increases as the number terms in the set of terms increases. For example, a length boost can be applied to a set of terms "chocolate chip" that match a phrase in the phrases database 208. Similarly, a set of terms "chocolate chip cupcakes" matching a phrase in the phrases database 208 can receive an additional length boost that is higher than the boost applied to the set of terms "chocolate chip" alone. In another example, a length boost can be applied to a set of terms "tea pot." Generally, the term "tea" may appear in search queries with a greater frequency than "tea pot." However, the terms "tea pot" carries special meaning since it refers to a specific entity. Thus, longer phrases that point to specific entities can be biased using length boosting, since these longer phrases, when broken, will lose their intended meaning.

One example approach for scoring a phrase in a segmentation of a search query:

$$score = s + s*(ls)$$

where s is a score that is based on the number of terms in the phrase, and where ls is a score that is based on a number of resources, e.g., as obtained from the phrases database, that include the terms in the phrase.

For example, each resource from which phrases are extracted can be assigned a weight and this weight can be used in determining ls. In one example, a set of terms "phone case" may have been extracted from a wiki resource and from a product database. The wiki resource may have an assigned weight of 5 and the product database may have an assigned weight of 1. In this example, the ls value for "phone case" will be 6.

One example approach for calculating s is:

$$s = f^{g(length)}$$

where $f$ is the length-weighted frequency of the phrase in a collection of search queries, e.g., query log, and where g is a function for generating a score based on the number of terms in the phrase.

One example approach for calculating $f$ is:

$$f = rf * \left(\frac{nl}{ql}\right)$$

where $f$ is the raw frequency of the phrase in a collection of search queries, e.g., query logs, where nl is the ngram length of the phrase, and where ql is the length of the search query.

This approach of scoring a phrase is repeated until all phrases in the segmentation have been scored. The score for the segmentation is determined by adding the scores of each phrase in the segmentation. For example, if the segmentation of a search query for "sweater under $50" is "sweater" and "under $50," then a first score is determined for "sweater" and a second score is determined for "under $50," as described above. The score for the segmentation "sweater" and "under $50" is then the first score and the second score added.

In some implementations, the score is adjusted using behavioral data. For example, behavioral data can include collocated sequences of terms (e.g., two or more terms) occurring together with a threshold number of occurrences (e.g., 10 occurrences), for example, in a collection of search queries, e.g., query log. An adjustment factor measuring a collocated sequence of terms can be determined using, for example, a likelihood ratio, pointwise mutual information, etc., measuring how often terms in the sequence of terms appear together. A logarithm of the adjustment factor to base 10 can be calculated. The score can be adjusted by multiplying the score by the adjustment factor.

Figure 3:
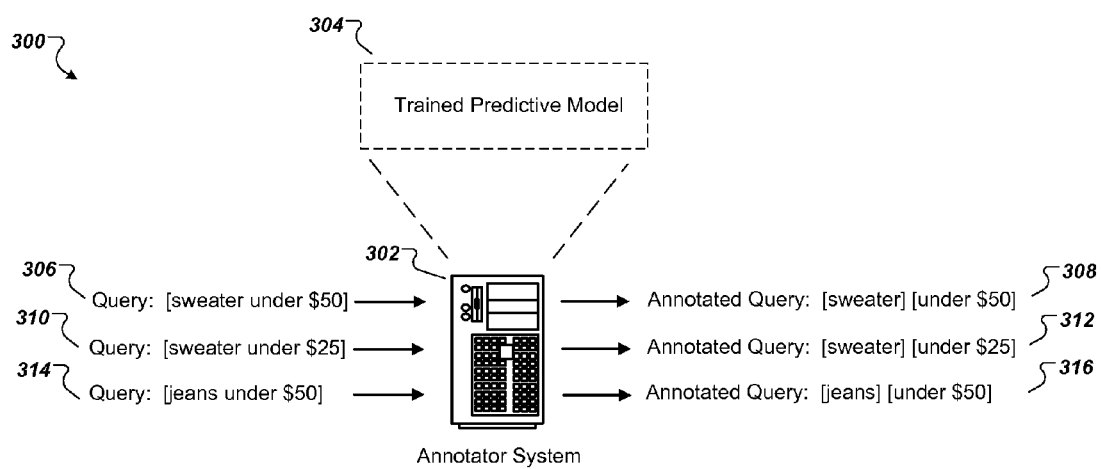
FIG. 3 illustrates an example diagram of an annotator system utilizing a trained predictive model to automatically segment and annotate new search queries in accordance with various embodiments.

Once each segmentation of the search query 204 is scored, the annotator system 202 selects the segmentation having the best score to be included in the training data that will be used to train a segmentation model, as described in reference to FIG. 3.

In the example of FIG. 2, the first segmentation "sweater under $50" was determined to have a score of 0.2, the second segmentation "sweater" and "under $50" was determined to have a score of 0.9, the third segmentation "sweater under" and "$50" was determined to have a score of 0.25, and the fourth segmentation "sweater," "under," and "$50" was determined to have a score of 0.4.

Thus, in this example, the best segmentation for the search query 204 "sweater under $50" is the segmentation in which the term "sweater" is treated as a first phrase and where the set of terms "under $50" are treated as a second phrase. This particular segmentation will then be selected for inclusion in the training data.

Training data typically includes input data and the desired predictive output for that input data. In this example, the training data will include an entry in which the search query "sweater under $50" is the input data and the segmented search query "sweater" and "under $50" as the desired predictive segmentation.

The annotator system 202 can continue to generate respective scores for each segmentation of a variety of search queries, for example, as obtained from the query logs 210, and select the respective segmentations for each search query having the best score to be included in the training data, as described above.

FIG. 3 illustrates an example diagram of an annotator system 302 utilizing a trained predictive model 304 to automatically segment and annotate new search queries in accordance with various embodiments. The annotator system 302 will generally include memory for storing instructions and data as well as a processor for executing the stored instructions.

The annotator system 302 also includes a trained predictive model 304. The predictive model 304 is configured to predict the best segmentation for any given search query. To make such predictions, the predictive model 304 is trained using the training data that was generated, as described above in reference to FIG. 2. Once trained, the predictive model 304 is configured to receive a search query as input data and to output a predicted segmentation for that search query. The predictive model 304 can be configured to utilize any generally known machine learning techniques for statistically predicting an output from a given input. In some embodiments, the predictive model 304 utilizes a conditional random field statistical modeling method to predict the segmentation for a search query.

As shown in FIG. 3, the annotator system 302 receives a search query 306 "sweater under $50" and utilizes the trained predictive model 304 to output a predicted segmentation 308 "sweater" and "under $50" for that search query 306. According to this segmentation, the term "sweater" is treated as one phrase and the set of terms "under $50" are treated as a separate phrase.

Similarly, the annotator system 302 receives a search query 310 "sweater under $25" and utilizes the trained predictive model 304 to output a predicted segmentation 312 "sweater" and "under $25" for that search query 310. According to this segmentation, the term "sweater" is treated as one phrase and the set of terms "under $25" are treated as a separate phrase.

Further, the annotator system 302 receives a search query 314 "jeans under $50" and utilizes the trained predictive model 304 to output a predicted segmentation 316 "jeans" and "under $50" for that search query 316. According to this segmentation, the term "jeans" is treated as one phrase and the set of terms "under $50" are treated as a separate phrase.

In some embodiments, the predicted segmentation for a search query is used to annotate the original search query to identify phrases that appear in the search query. For example, the search query can be annotated using JavaScript Object Notation (JSON). The annotated search query can be provided to a search engine, for example, to generate search results that reference resources that are more responsive to the search query.

Figure 4:
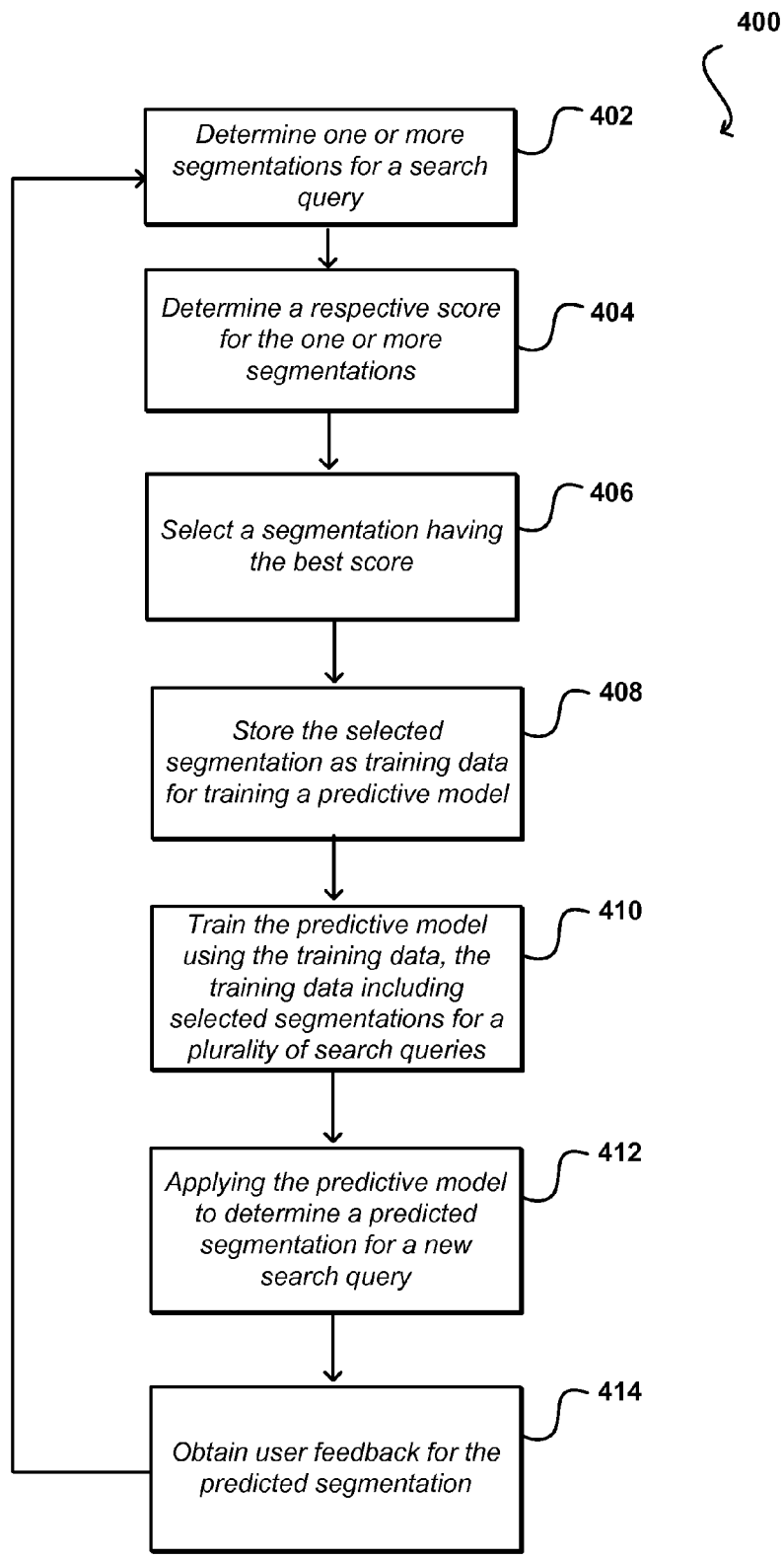
FIG. 4 is a flow diagram of an example process for segmenting and annotating search queries.

FIG. 4 illustrates a flow diagram of an example process 400 for segmenting and annotating search queries. The example process 400 is provided merely as an example and additional or fewer steps may be performed in similar or alternative orders, or in parallel, within the scope of the various embodiments described in this specification.

A computing device determines one or more segmentations for each search query in a collection of search queries 402. Each search query can include a plurality of terms, and each segmentation can identify at least one potential phrase that includes at least one term that appears in the search query.

The computing device can determine, for each search query in the collection of search queries, a respective score for each of the one or more segmentations of the search query 404.

The computing device can select, for each search query in the collection of search queries, a segmentation having a best score from the one or more respective segmentations of the search query 406. The selected segmentation can identify at least one actual phrase that includes at least one term that appears in the search query. The computing device can store the selected segmentation for each search query in the collection of search queries as training data for training a predictive model 408.

The computing device can use the training data to train the predictive model 410. The predictive model can be used to obtain predicted segmentations for new search queries that are submitted by users. The predicted segmentations can be used to annotate the search queries to identify phrases that appear in the respective search queries.

The predictive model can be applied to predict segmentations for other search queries 412. For example, the predictive model can predict a segmentation for a new search query. This predicted segmentation can be used to obtain a listing of search results by a search engine. The listing of search results can be provided to the user.

The computing device can obtain feedback from the user indicating whether or not the predicted segmentation for the new search query was accurate 414. For example, the computing device can obtain behavioral data of the user indicating whether or not the predicted segmentation for the new search query was accurate. This behavioral data can include, for example, whether or not the user clicked on search results in the listing or whether the user purchased any products referenced in the listing of search results. This behavioral data can be used to refine the segmentation scores of other search queries that are received in the future.

Figure 5:
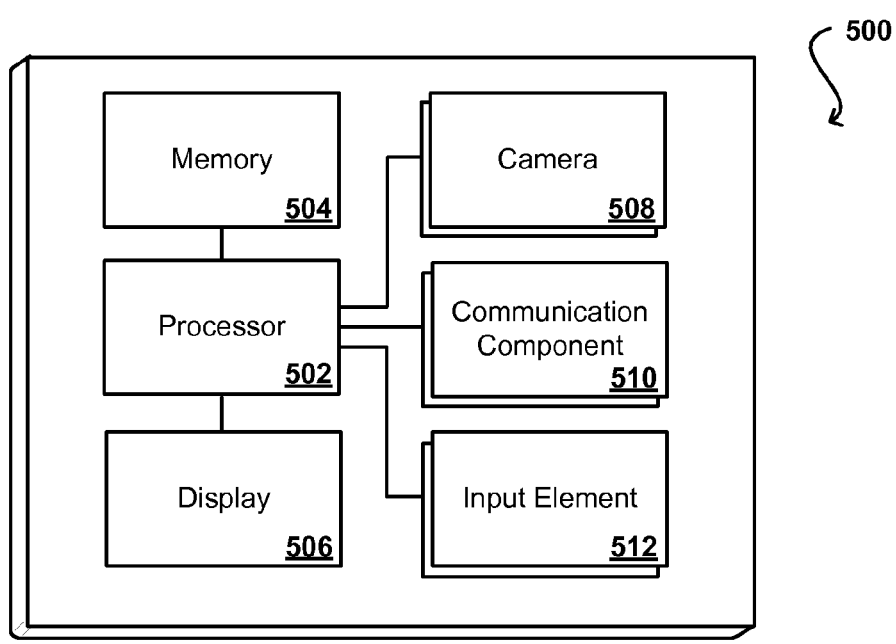
FIG. 5 illustrates example components of a computing device.

FIG. 5 illustrates a logical arrangement of a set of general components of an example computing device 500. In this example, the device includes a processor 502 for executing instructions that can be stored in a memory device or element 504. As would be apparent to one of ordinary skill in the art, the device can include many types of memory, data storage, or non-transitory computer-readable storage media, such as a first data storage for program instructions for execution by the processor 502, a separate storage for images or data, a removable memory for sharing information with other devices, etc. The device typically will include some type of display element 506, such as a touch screen or liquid crystal display (LCD), although devices such as portable media players might convey information via other means, such as through audio speakers. As discussed, the device in many embodiments will include at least one image capture element 508 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 512, such as a mono or stereo microphone or microphone array, operable to capture audio information from at least one primary direction. A microphone can be a uni-or omni-directional microphone as known for such devices.

In some embodiments, the computing device 500 of FIG. 5 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 500 also can include at least one orientation or motion sensor 510. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 502, whereby the device can perform any of a number of actions described or suggested herein.

As an example, a computing device can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 6:
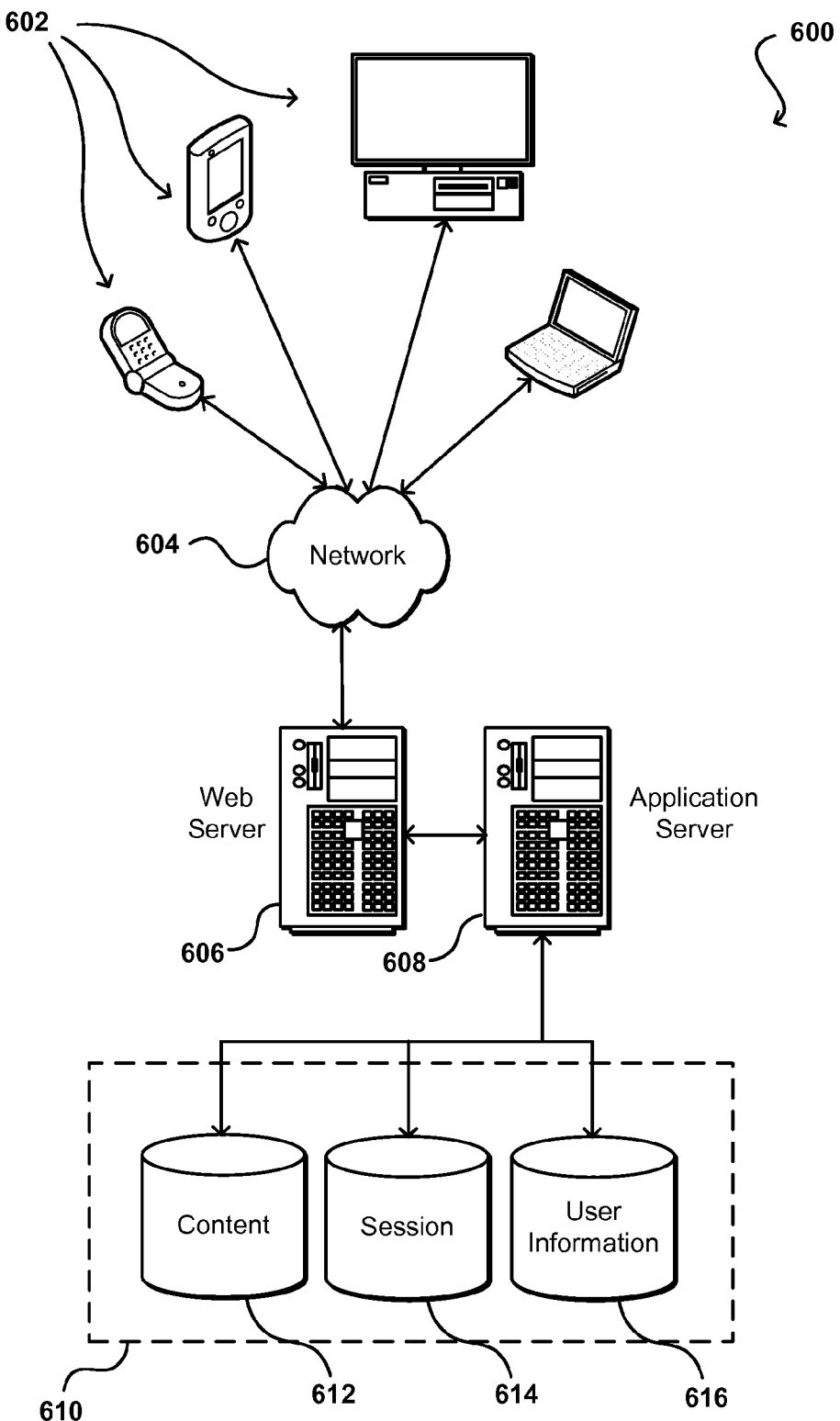
FIG. 6 illustrates an example of an environment for implementing aspects in accordance with various embodiments.

As discussed, different approaches can be implemented in various environments in accordance with the described embodiments. For example, FIG. 6 illustrates an example of an environment 600 for implementing aspects in accordance with various embodiments. As will be appreciated, although a Web-based environment is used for purposes of explanation, different environments may be used, as appropriate, to implement various embodiments. The system includes electronic client devices 602, which can include any appropriate device operable to send and receive requests, messages or information over an appropriate network 604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 606 for receiving requests and serving content in response thereto, although for other networks, an alternative device serving a similar purpose could be used, as would be apparent to one of ordinary skill in the art.

The illustrative environment includes at least one application server 608 and a data store 610. It should be understood that there can be several application servers, layers or other elements, processes or components, which may be chained or otherwise configured, which can interact to perform tasks such as obtaining data from an appropriate data store. As used herein, the term "data store" refers to any component or combination of components capable of storing, accessing and retrieving data, which may include any combination and number of data servers, databases, data storage components and data storage media, in any standard, distributed or clustered environment. The application server 608 can include any appropriate hardware and software for integrating with the data store 610 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 606 in the form of HTML, XML or another appropriate structured language in this example. The handling of all requests and responses, as well as the delivery of content between the client devices 602 and the application server 608, can be handled by the Web server 606. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing content (e.g., production data) 612 and user information 616, which can be used to serve content for the production side. The data store is also shown to include a mechanism for storing log or session data 614. It should be understood that there can be many other aspects that may need to be stored in the data store, such as page image information and access rights information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 602. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized components, each such component can include hardware elements that may be electrically coupled via a bus, the elements including, for example, at least one central processing unit (CPU), at least one input component (e.g., a mouse, keyboard, controller, touch-sensitive display element or keypad) and at least one output component (e.g., a display component, printer or speaker). Such a system may also include one or more storage components, such as disk drives, optical storage components and solid-state storage components such as random access memory (RAM) or read-only memory (ROM), as well as removable media components, memory cards, flash cards, etc.

Such devices can also include a computer-readable storage media reader, a communications component (e.g., a modem, a network card (wireless or wired), an infrared communication component) and working memory as described above. The computer-readable storage media reader can be connected with, or configured to receive, a computer-readable storage medium representing remote, local, fixed and/or removable storage components as well as storage media for temporarily and/or more permanently containing, storing, transmitting and retrieving computer-readable information. The system and various devices also typically will include a number of software applications, modules, services or other elements located within at least one working memory component, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage components or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, the method comprising:
    obtaining a collection of phrases from at least one electronic resource;
    generating, from a collection of search queries, respective counts of each n-gram of terms that appears in search queries in the collection of search queries;
    determining, based at least in part on the collection of phrases and the respective counts of the n-grams, a respective segmentation for each search query in the collection of search queries, wherein the search query comprises a plurality of terms, and wherein the segmentation identifies at least one phrase using at least one term of the search query;
    storing, in a database of a service provider environment, the service provider environment including a plurality electronic resources available over a network, the respective segmentation for each search query in the collection of search queries to be used as training data for training a predictive model, wherein the training data includes a plurality of search queries in the collection of search queries as an input and the corresponding segmentation for the search queries as an output; and
    generating the predictive model using at least the training data, wherein the trained predictive model is configured to predict respective segmentations for new search queries.

2. The computer-implemented method of claim 1, wherein generating the respective segmentation for a search query further comprises:
    determining a respective score for each possible segmentation of the search query, wherein each segmentation identifies at least one potential phrase using at least one term in the search query,
    wherein the score is based at least in part on (i) matching the at least one potential phrase with at least one phrase in the collection of phrases and (ii) a frequency with which the at least one potential phrase appears in the collection of search queries.

3. The computer-implemented method of claim 1, further comprising:
    providing at least one different search query as an input to the predictive model, wherein the different search query comprises a plurality of terms; and
    receiving, from the predictive model, a predicted segmentation for the different search query, wherein the predicted segmentation identifies at least one phrase using at least one term of the different search query.

4. A computing device comprising:
    one or more processors; and
    memory storing instructions that, when executed by the one or more processors, cause the computing device to perform operations, comprising:
        determining one or more segmentations for each search query in a collection of search queries, wherein each search query includes a plurality of terms, and wherein each segmentation identifies at least one potential phrase that includes at least one term that appears in the search query;
        determining, for each search query in the collection of search queries, a respective score for each of the one or more segmentations of the search query;
        selecting, for each search query in the collection of search queries, at least one segmentation having a best score from the one or more respective segmentations of the search query, wherein the at least one selected segmentation identifies at least one actual phrase that includes at least one term that appears in the search query; and
        storing the at least one selected segmentation for each search query in the collection of search queries as training data for training a predictive model.

5. The computing device of claim 4, wherein the operations further comprise:
    generating the trained predictive model using at least the stored training data, wherein the trained predictive model is configured to automatically predict respective segmentations for new search queries.

6. The computing device of claim 5, wherein the operations further comprise:
    obtaining, from the trained predictive model, a predicted segmentation for a new search query, wherein the new search query includes a plurality of terms, and wherein the predicted segmentation identifies at least one phrase that comprises at least one term in the plurality of terms.

7. The computing device of claim 6, wherein the operations further comprise:
annotating the new search query based at least in part on the predicted segmentation to identify the at least one phrase.

8. The computing device of claim 7, wherein the operations further comprise:
providing data describing the annotated new search query to a search system, wherein the search system is able to identify at least one resource that is responsive to the at least one phrase; and
receiving from the search system a listing of search results, wherein the listing includes at least one search result that references the at least one resource that is responsive to the at least one phrase.

9. The computing device of claim 7, wherein annotating the new search query based at least in part on the predicted segmentation to identify the at least one phrase further comprises:
annotating the new search query to indicate a type or category that corresponds to the at least one phrase.

10. The computing device of claim 4, wherein determining, for each search query in the collection of search queries, the respective score for each of the one or more segmentations of the search query further comprises:
determining, for each segmentation, the respective score based at least in part on the at least one phrase identified in the segmentation matching at least one known phrase in a collection of phrases.

11. The computing device of claim 6, wherein the collection of phrases includes information extracted from at least one authoritative resource, wherein the authoritative resource includes at least one of a dictionary, an encyclopedia, a listing of keywords associated with product or service identifiers, a product brand listing, and a product or service classification.

12. The computing device of claim 6, wherein the collection of phrases includes at least one set of terms that appear in search queries with a threshold frequency.

13. The computing device of claim 6, wherein the collection of phrases includes at least one set of terms i) that appeared in a plurality of search queries submitted by at least one user and that were substituted with at least one different term in subsequent search queries submitted by the at least one user, ii) that is collocated sequence of terms, or iii) both.

14. The computing device of claim 4, wherein determining, for each search query in the collection of search queries, the respective score for each of the one or more segmentations of the search query further comprises:
determining, for each segmentation, the respective score based at least in part on a frequency with which the at least one phrase identified in the segmentation is included in search queries in a collection of search queries.

15. The computing device of claim 4, wherein determining, for each search query in the collection of search queries, the respective score for each of the one or more segmentations of the search query further comprises:
determining, for each segmentation, a respective count of a number of terms in the at least one phrase identified in the segmentation; and
increasing the respective score for each segmentation based at least in part on the respective count of the number of terms in the at least one phrase identified in the segmentation.

16. The computing device of claim 4, wherein storing the at least one selected segmentation for each search query in the collection of search queries as training data for training a predictive model further comprises:
storing each search query in the collection of search queries as input data; and
storing, for each search query in the collection of search queries, the at least one selected segmentation for the search query as output data.

17. A computing device comprising:
one or more processors; and
memory storing instructions that, when executed by the one or more processors, cause the computing device to perform operations, comprising:
obtaining training data that includes a plurality of search queries as input data and respective segmentations of the search queries as output data, wherein each search query includes a plurality of terms, and wherein each respective segmentation of the search query identifies at least one phrase that includes at least one term that appears in the search query;
generating a statistical model using the trained data and at least one machine learning technique, wherein the statistical model is configured to predict corresponding segmentations for new search queries;
obtaining, from the statistical model, a predicted segmentation for a different search query, wherein the predicted segmentation identifies at least one phrase in the different search query; and
determining at least one annotation for the different search query based at least in part on the predicted segmentation to identify the at least one phrase.

18. The computing device of claim 17, further comprising:
providing data describing the annotated different search query to a search system, wherein the search system is able to identify at least one resource that is responsive to the at least one phrase.

19. The computing device of claim 17, wherein determining at least one annotation for the different search query further comprises:
labeling the different search query to indicate at least one type or category that corresponds to the at least one phrase.

20. The computing device of claim 17, wherein the statistical model comprises a conditional random field statistical model.

* * * * *